(12) United States Patent
Matsukura et al.

(10) Patent No.: US 8,835,540 B2
(45) Date of Patent: Sep. 16, 2014

(54) LIQUID SILICONE RUBBER COMPOSITION FOR HIGH VOLTAGE INSULATION PARTS

(75) Inventors: Toshihiko Matsukura, Tokyo (JP); Hiroyoshi Iijima, Tokyo (JP)

(73) Assignee: Momentive Performance Materials Japan LLC, Minato-ku, Tokyo (JP)

( * ) Notice: Subject to any disclaimer, the term of this patent is extended or adjusted under 35 U.S.C. 154(b) by 0 days.

(21) Appl. No.: 13/698,199

(22) PCT Filed: Sep. 28, 2011

(86) PCT No.: PCT/JP2011/072135
§ 371 (c)(1),
(2), (4) Date: Nov. 15, 2012

(87) PCT Pub. No.: WO2012/043600
PCT Pub. Date: Apr. 5, 2012

(65) Prior Publication Data
US 2013/0225735 A1    Aug. 29, 2013

(30) Foreign Application Priority Data

Oct. 1, 2010   (JP) .................................. 2010-223409
Sep. 15, 2011  (JP) .................................. 2011-202046

(51) Int. Cl.
*C08K 5/3492*    (2006.01)
*C08K 3/36*      (2006.01)

(52) U.S. Cl.
USPC ........................................ 524/100; 524/442

(58) Field of Classification Search
CPC ................................ C08K 5/3492; C08K 3/36
USPC ................................................ 524/100, 442
See application file for complete search history.

(56) References Cited

U.S. PATENT DOCUMENTS

| | | |
|---|---|---|
| 5,369,161 A | 11/1994 | Kunieda et al. |
| 5,519,080 A | 5/1996 | Matsushita et al. |
| 5,866,653 A | 2/1999 | Matsushita et al. |
| 5,942,571 A | 8/1999 | Nakamura et al. |
| 5,973,030 A | 10/1999 | Matsushita et al. |
| 5,977,216 A | 11/1999 | Meguriya et al. |
| 5,994,461 A | 11/1999 | Nakamura et al. |
| 6,890,662 B2 | 5/2005 | Yaginuma et al. |
| 7,385,000 B2 | 6/2008 | Kuhn et al. |
| 2003/0232202 A1 | 12/2003 | Yaginuma et al. |
| 2004/0254275 A1* | 12/2004 | Fukui et al. .................... 524/261 |
| 2006/0084744 A1 | 4/2006 | Kuhn et al. |
| 2006/0084745 A1 | 4/2006 | Kuhn et al. |
| 2007/0066783 A1* | 3/2007 | Woerner et al. ................. 528/15 |

FOREIGN PATENT DOCUMENTS

| | | |
|---|---|---|
| JP | 4-209655 | 7/1992 |
| JP | 7-57574 | 3/1995 |
| JP | 9-316336 | 12/1997 |
| JP | 9-320342 | 12/1997 |
| JP | 9-324123 | 12/1997 |
| JP | 10-168317 | 6/1998 |
| JP | 10-212414 | 8/1998 |
| JP | 11-12470 | 1/1999 |
| JP | 11-111087 | 4/1999 |
| JP | 2003-292782 A | 10/2003 |
| JP | 2004-18701 | 1/2004 |
| JP | 2006-111881 A | 4/2006 |
| JP | 2006-111882 A | 4/2006 |
| JP | 2006-182911 | 7/2006 |
| JP | 2010-13495 | 1/2010 |

* cited by examiner

*Primary Examiner* — Kriellion Sanders

(74) *Attorney, Agent, or Firm* — Flynn, Thiel, Boutell & Tanis, P.C.

(57) ABSTRACT

A silicone rubber composition contains: (A) 100 parts by weight of a dimethylpolysiloxane sequestered at both ends of the molecular chain thereof by a dimethylvinylsiloxy group; (B) 5 to 100 parts by weight of a dry silica, treated by a vinyl group-containing organosilicon compound and having a specific surface area of 50 $m^2/g$ or more; (C) 5 to 100 parts by weight of a copolymer of dimethylsiloxane and methylhydrogen siloxane; (D) platinum or a platinum compound as a curing agent in an amount of 1 to 1,000 ppm as platinum atom to the total amount of component (A) and component (C); and (E) triazole or a derivative of triazole, in an amount of 1 to 10,000 ppm to the total amount of (A) component and (C) component.

4 Claims, No Drawings

LIQUID SILICONE RUBBER COMPOSITION FOR HIGH VOLTAGE INSULATION PARTS

TECHNICAL FIELD

The present invention relates to a liquid silicone rubber composition used in electric power components such as a power cable, and specifically relates to a liquid silicone rubber composition for high voltage insulation parts which are applied to connecting portions of power cables such as an intermediate connecting portion of power cables and a terminal connecting portion of a power cable terminal and a metal terminal, and further relates to electric power components such as a power cable using the liquid silicone rubber composition.

In particular, the present invention relates to a liquid silicone rubber composition forming a cured silicone rubber which has an extremely high tension set emphasized in the cold-shrink connection method for power cables, a high tracking resistance to give excellent high voltage insulation, excellent mechanical properties required for electric power components, and relates to an electric power component such as a power cable using the liquid silicone rubber composition.

BACKGROUND ART

Until now, silicone rubber has been used as electric power components such as a cable accessory for electric wire coating at a connecting portion of power cables because of its excellent heat resistance, electric properties, weatherability, and the like.

In particular, a silicone rubber having a high electric insulation is used as a coating material of a High Voltage Insulator (HVI) used at high voltages, and in branching and connecting the high voltage cable, there is frequently applied the cold-shrink connection method which is conducted by inserting a conductor to be branched and connected, into a silicone rubber insulator expanded in diameter in advance, and then by pulling out the separator to thereby shrink the silicone rubber insulator.

At this time, in the cold-shrink connection method, since the silicone rubber is used as the insulator for the cable accessory, the silicone rubber is required to have a tracking resistance that can withstand high voltage, to thereby have an excellent high voltage insulation. Furthermore, since the silicone rubber is applied to the cold-shrink connection method, it is important that the rubber expanded in diameter shrinks, at the time of pulling out the separator, to an original size close to the diameter before expansion, and thus to keep adhering to the conductor.

That is, the silicone rubber is required to have a tracking resistance to thereby give an excellent high voltage insulation, and to have good tension set. In addition to this, in order to achieve a good balance between both of those properties, it is also important not to deteriorate the mechanical properties necessary as the electric power components.

Until now, from the viewpoint of the material that can withstand high voltages, in order to improve the tracking resistance, there have been provided materials such as the one having a low viscosity dimethylpolysiloxane that bleeds onto the surface of the cured material, and the one having a hydroxyl group, alkoxyl group, and the like that directly bind to silicon atoms at both terminals of dimethylpolysiloxane (JP-A 7-57574, JP-A 09-324123, and JP-A 11-111087).

In addition, there are other ones in which an inorganic filler such as zinc carbonate, aluminum hydroxide or the like is added (JP-A 9-320342 and JP-A 4-209655) and, furthermore, the one in which a silicone resin is contained, as the one not containing an inorganic filler (JP-A 11-12470).

Moreover, there is further one that is aimed at improvement in the tracking resistance by using a nitrogen-containing organic compound such as a triazole-based compound in combination with a platinum catalyst or an inorganic filler (JP-A 9-316336).

Although these technologies surely improve the tracking resistance, any of the methods produce negative effects on the tension set, and thus a good balance between excellent tracking resistance and excellent low tension set cannot be achieved.

As the prior art for achieving a good balance between the excellent tracking resistance and the low tension set, there are disclosed the one in which a nitrogen-containing organic compound is added, and thus the tracking resistance test at 3.5 KV is satisfied while low tension set property is maintained, and furthermore the one in which the tracking resistance test at 4.5 KV is satisfied by the addition of a phenyl group-containing silicone oil. However, the prior art cannot satisfy severe quality requirements as the material constituting electric power components (JP-A 2004-18701).

SUMMARY OF THE INVENTION

However, the prior art disclosed in JP-A 7-57574, JP-A 9-324123, JP-A 11-111087, JP-A 9-320342, JP-A 4-209665, JP-A 11-12470, and JP-A 9-316336 have the following problems. That is, the material containing oil that bleeds onto the surface of cured rubber is inclined to deteriorate the mechanical properties. Also in the case of adding an inorganic filler such as zinc carbonate or aluminum hydroxide, there cannot be attained the strength required in the cold-shrink method. Moreover, a large amount of inorganic filler filled increases the viscosity, which raises a problem in which the prior art cannot be used for applications of materials requiring flowability such as materials for injection molding and for casting.

Furthermore, a material containing silicone resin exhibits poor mechanical strength, and cannot be used in the cold-shrink method.

Moreover, since a material containing phenyl group-containing silicone oil deteriorates the mechanical strength and has the basis of silicone crude rubber, the material cannot be used for injection molding and casting, both of which require flowability of the material. In addition to this, in all the examples of the above prior art, a metal oxide compound is contained, and thus the mechanical properties required for the cold-shrink method cannot be attained.

Furthermore, a material without containing phenyl group has a problem of failing to pass the tracking test at 4.5 KV, and also does not satisfy the recent severe quality requirements of the tension set.

The present invention has been made in order to solve the above-mentioned problems, and an object of the present invention is to provide a liquid silicone rubber composition that forms a cured material suitable for the cold-shrink connection method for power cable because of an extremely low tension set, and at the same time, having mechanical properties such as tensile strength required for an electric power component and having good tracking resistance, to thereby give an excellent high voltage insulation, and to provide an electric power component using the liquid silicone rubber composition.

The present invention provides a silicone rubber composition, containing: (A) 100 parts by weight of a dimethylpolysiloxane sequestered or terminated at both ends of the molecular chain thereof by a dimethylvinylsiloxy group; (B) 5 to 100 parts by weight of a dry silica, treated by a vinyl group-containing organosilicon compound and having a specific surface area of 50 m$^2$/g or more; (C) 5 to 100 parts by weight of a copolymer of dimethylsiloxane and methylhydrogen siloxane; (D) platinum or a platinum compound as a curing agent, in an amount of 1 to 1,000 ppm as platinum atoms to the total amount of component (A) and component (C); and (E) triazole or a derivative thereof, in an amount of 1 to 10,000 ppm to the total amount of (A) component and (C) component, wherein the amount of vinyl group derived from the component (B) is 40% by mole or more to the total amount of vinyl groups in the composition, and the ratio of the molar number of hydrogen atoms binding to the silicon atoms in the composition relative to the molar number of alkenyl group binding to the silicon atoms is in a range of 3.0 to 10.0.

Furthermore, the present invention also provides a high voltage insulation parts containing a cured material of the above-mentioned liquid silicone rubber composition.

DETAIL DESCRIPTION OF THE INVENTION

Hereinafter, the present invention will be described in detail.

The dimethylpolysiloxane being sequestered at both ends of molecular chain thereof by dimethylvinylsiloxy group used as the component (A) preferably has a viscosity in a range of 100 to 1,000,000 cSt, and more preferably in a range of 1,000 to 100,000 cSt. The dimethylpolysiloxane having the viscosity in the above specified range can be used alone or by blending them. In addition, there may be added a copolymer of dimethylsiloxane and methylvinyl siloxane thereto in combination.

The dry silica used as the component (B) is one having a specific surface area of 50 m$^2$/g or more, and preferably 200 m$^2$/g or more. The dry silica may be treated on the surface thereof by hexamethylsilazane, trimethylchlorosilane, and the like.

A feature of the present invention is to use a material in which a vinyl group has been carried onto dry silica by treating, with a vinyl group-containing organosilicon compound, the dry silica having a specific surface area of 50 m$^2$/g or more.

Here, the surface treatment of dry silica by a vinyl group-containing organosilicon compound and the like is known as the method for giving an adequate hardness and for improving mechanical strength (JP-A 2010-13495).

The vinyl group-containing silicon organic compound includes divinyltetramethyldisilazane, vinyl group-containing chlorosilane, vinyl group-containing organosiloxane oligomer, vinyl group-containing branched organopolysiloxane, and the like. Any of vinyl group-containing surface treatment agents may be used if only they react with silanol on the surface of dry silica.

As examples of the method for preparing the component (B), dry silica may be surface-treated in advance by a vinyl group-containing organosilicon compound, and in preparing the material, that is, in preparing the silicone compound, the preparation may be performed by blending, with the component (A), a vinyl group-containing organosilicon compound and the dry silica.

At this time, the addition rate of vinyl group to the dry silica can be confirmed by $^{29}$Si NMR or the like because there is added the vinyl group that is the same as the vinyl group contained in the raw material of vinyl group-containing organosilicon compound.

Here, the addition amount of the component (B) is in a range of 5 to 100 parts by weight relative to 100 parts by weight of the component (A), and in order to achieve the object of the present invention, it is necessary that the amount of vinyl group derived from the component (B) is 40% by mole or more relative to the total amount of vinyl group in the composition.

When the amount of vinyl group derived from the component (B) is less than 40% by mole relative to the total amount of vinyl group in the composition, a composition in which both tension set and tracking resistance are excellent cannot be obtained.

The copolymer of dimethylsiloxane and methylhydrogen siloxane to be added as the component (C) has hydrogen atoms directly binding to two or more, preferably three or more, of silicon atoms per single molecule, in order to conduct addition reaction with the alkenyl group-containing organopolysiloxane and to crosslink with it to thereby change the composition into a rubber elastic body. The organic group binding to a silicon atom, other than a hydrogen atom, is a group selected from the group consisting of an alkyl group, phenyl group, and 3,3,3-trifluoropropyl group. Among these, a methyl group is the most preferable because of ease in synthesis.

The copolymer of dimethylsiloxane and methylhydrogen siloxane may be any of the ones having the siloxane skeleton in a straight form, a branched form, or a cyclic form. The copolymer of dimethylsiloxane and methylhydrogen siloxane preferably has a viscosity of 10 to 1,000 centipoise and specifically 20 to 500 centipoise, at 25° C.

The addition amount of the component (C) is in a range of 5 to 100 parts by weight relative to 100 parts by weight of the component (A), and specifically preferably 5 to 50 parts by weight. In this case, the ratio of the molar number of hydrogen atoms binding to the silicon atoms contained in the component (C) relative to the molar number of alkenyl group binding to the silicon atoms contained in the component (A) and the component (B) is in a range of 3.0 to 10.0, preferably 3.0 to 8.0, and more preferably 3.0 to 6.0.

This range is intended for, by adding the component (C) by an excessive amount (molar ratio) relative to the alkenyl group derived from the component (A) and the component (B), causing the vinyl group having been carried on the surface of silica in advance sufficiently to bind to the copolymer of dimethylsiloxane and methylhydrogen siloxane as the insulator.

The addition amount within the above range protects the surface of silica causing the conduction of electricity, by the insulation material, thereby improving the tracking resistance. When the addition amount of the component (C) is less than 5 parts by weight, or when the molar ratio thereof is less than 3.0, the tracking resistance cannot be satisfied. When the addition amount of the component exceeds 100 parts by weight, or when the molar ratio thereof is larger than 10.0, adverse effects on the mechanical properties are caused.

Moreover, the total amount of vinyl groups is not particularly specified, and the amount can be arbitrarily selected depending on the properties such as rubber hardness. However, the amount is adjusted so as to exhibit the functions, at least, as rubber.

The platinum-based catalyst to be added as the component (D) is a hydrosilylation catalyst. Examples of the platinum-based catalysts applied here include: Ramoro catalyst (platinum-octanol complex, U.S. Pat. No. 473,377); Ashby catalyst (platinum-vinyl group-containing cyclic siloxane complex, U.S. Pat. No. 4,288,345); and Karstedt catalyst (platinum-vinyl group-containing disiloxane complex, U.S. Pat. No. 3,814,730).

The addition amount of the platinum-based catalyst in the present invention is in a range of 1 to 1,000 ppm as platinum relative to the total amount of component (A) and component (B), and preferably 5 to 100 ppm. There can be arbitrarily added an addition reaction suppressor such as 1-ethynyl-1-cyclohexanol, as necessary.

As the component (E), triazole or a derivative thereof is used.

Known effects of the addition of triazole or a derivative thereof to the silicone rubber composition include: the low compression strain effect (JP-A 2-242854); the fire-retardant imparting effect (JP-A 4-33961); and the anti-mold effect (JP-A 9-25410).

In addition, the effect of triazole or a derivative thereof on the tracking resistance is known, (JP-A 8-152977 and JP-A 2004-18701).

However, when triazole or a derivative thereof is added to the liquid silicone rubber of the addition reaction curing type, it is not widely known that the tension set extremely deteriorates, with tension set being an important characteristic in the cold-shrink connection method, and there is a serious issue of attaining both an excellent tracking resistance and low tension set at a time.

Here, examples of triazole or a derivative thereof are benzotriazole, 1,2,3-triazole, 1,2,4-triazole, and derivatives thereof.

Specific examples thereof include benzotriazole, 1-methylbenzotriazole, 5,6-dimethylbenzotriazole, 2-phenylbenzotriazole, 1-methyl-1,2,3-triazole, 1-phenyl-1,2,3-triazole, 4-methyl-2-phenyl-1,2,3-triazole, 1-methyl-1,2,4-triazole, and 1,3-diphenyl-1,2,4-triazole. Triazole or a derivative thereof can be used alone or by blending two or more of them.

According to the present invention, among triazoles or derivatives thereof, 1,2,4-triazole is preferred.

The addition amount of the component (E) is in a range of 1 to 10,000 ppm relative to the total amount of component (A) and component (C), preferably 1 to 1000 ppm, and more preferably 10 to 500 ppm.

When the amount of component (E) is less than 1 ppm, the tracking resistance deteriorates. When the amount of the component (E) is above 10,000 ppm, adverse effects on the low tensile set are caused, which is an object of the present invention, and further induces the inhibition of curing, thereby resulting in insufficient curing in some cases.

The component (E) has generally a high melting point (for example, 1,2,4-triazole has a melting point of 120° C. to 121° C.), and is in a solid state at a normal temperature. Accordingly, the component (E) is preferably used by dissolving it in a solvent such as water; alcohol including methanol, ethanol, and isopropyl alcohol; and ketone such as acetone. By using the component (E) in a state of being dissolved in a solvent, there can be attained uniform dispersion in the cured material, and thus greater effects can be produced. As the solvent, above all, water, methanol, and ethanol are preferred.

Before curing the composition, these solvents are preferably removed by heating and/or depressurizing the system. The heating temperature in this case is preferably in a range of 100° C. to 200° C. When heating and depressurizing are applied, the pressure is preferably 50 kPa or below, and more preferably 30 kPa or below.

As described above, by specifying that the amount of vinyl group derived from the component (B) is 40% or more relative to the total amount of vinyl groups of the composition, and that the ratio of the molar number of hydrogen atoms binding to the silicon atoms relative to the molar number of alkenyl groups binding to the silicon atoms, that is, SiH/Alkenyl group (molar ratio), is in a range of 3.0 to 10.0, there can be obtained a liquid silicone rubber for high voltage insulation parts having a low tension set and exhibiting excellent tracking resistance. Furthermore, there can be provided high tracking resistance without deteriorating the tension set property, even by the combined use of triazole or derivatives thereof being the component (E).

It should be noted that, to the liquid silicone rubber for high voltage insulation parts according to the present invention, there can be added a processing aid, heat-resistant additive, mold releaser, coloring matter, inorganic and organic fillers and the like, which are conventionally used in silicone rubber compositions optionally, within a range not impairing the object of the present invention.

EXAMPLES

Example 1

Relative to 100 parts by weight of (A) dimethylpolysiloxane having a viscosity of 50,000 cSt, being sequestered at both ends of the molecular chain thereof by a dimethylvinylsiloxy group, there were mixed: 36 parts by weight of (B) fumed silica having a specific surface area of 300 $m^2/g$; an aqueous solution obtained by dissolving 0.0088 parts by weight of (E) 1,2,4-triazole in 2.5 parts by weight of water; 7.6 parts by weight of hexamethyldisilazane as the surface treatment agent of the fumed silica; and 0.44 parts by weight of divinyltetramethyldisilazane, at room temperature for 1 hour. The resultant mixture was heated to 150° C. for 1 hour while mixing thereof. After that, the mixture was mixed in a dissolver under a heated and reduced pressure condition for 1.5 hour, followed by the cooling thereof to room temperature, and a compound 1 was obtained.

Then, to the compound 1 containing 100 parts by weight of (A) dimethylpolysiloxane having a viscosity of 50,000 cSt, being sequestered at both ends of the molecular chain thereof by dimethylvinylsiloxy group, there were added: 1.3 parts by weight of copolymer (component (A)) of dimethylsiloxane and methylvinylsiloxane, being composed of 86.21% by mole of $(CH_3)_2SiO$ unit at 13.79% by mole of $(CH_3)(CH_2=CH)SiO$ unit, being sequestered at both ends of the molecular chain thereof by a dimethylvinylsiloxy group; 8.5 parts by weight of copolymer (component (C)) of dimethylsiloxane and methylhydrogen siloxane being composed of 50% by mole of methylhydrogen siloxane unit <$(CH_3)HSiO$ unit> and 50% by mole of dimethylsiloxane unit <$(CH_3)_2SiO$ unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as a suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Example 2

To the compound 1 containing 100 parts by weight of (A) dimethylpolysiloxane having a viscosity of 50,000 cSt, being sequestered at both ends of the molecular chain thereof by a dimethylvinylsiloxy group, prepared in Example 1, there were added: 10.2 parts by weight of copolymer (component (C)) of dimethylsiloxane and methylhydrogen siloxane, being composed of 50% by mole of methylhydrogen siloxane unit <(CH$_3$)HSiO unit> and 50% by mole of dimethylsiloxane unit <(CH$_3$)$_2$SiO unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Example 3

To the compound 1 containing 100 parts by weight of (A) dimethylpolysiloxane having a viscosity of 50,000 cSt, being sequestered at both ends of the molecular chain thereof by a dimethylvinylsiloxy group, prepared in Example 1, there were added: 1.3 parts by weight of a copolymer (component (A)) of dimethylsiloxane and methylvinylsiloxane, being composed of 86.21% by mole of (CH$_3$)$_2$SiO unit and 13.79% by mole of (CH$_3$)(CH$_2$=CH)SiO unit, being sequestered at both ends of the molecular chain thereof by a dimethylvinylsiloxy group; 10.2 parts by weight of copolymer (component (C)) of dimethylsiloxane and methylhydrogen siloxane being composed of 50% by mole of methylhydrogen siloxane unit <(CH$_3$)HSiO unit> and 50% by mole of dimethylsiloxane unit <(CH$_3$)$_2$SiO unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Example 4

To the compound 1 containing 100 parts by weight of (A) dimethylpolysiloxane having a viscosity of 50,000 cSt, being sequestered at both ends of the molecular chain thereof by a dimethylvinylsiloxy group, prepared in Example 1, there were added: 8.5 parts by weight of copolymer (component (C)) of dimethylsiloxane and methylhydrogen siloxane, being composed of 50% by mole of methylhydrogen siloxane unit <(CH$_3$)HSiO unit> and 50% by mole of dimethylsiloxane unit <(CH$_3$)$_2$SiO unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Comparative Example 1

An Example in which, in Total Amount of Vinyl Group, the Percentage of Vinyl Group Held by the Filler is not Satisfied Relative to 100 parts by weight of (A) dimethylpolysiloxane having a viscosity of 50,000 cSt, being sequestered at both ends of the molecular chain thereof by a dimethylvinylsiloxy group, there were blended: 36 parts by weight of (B) fumed silica having a specific surface area of 300 m$^2$/g; an aqueous solution obtained by dissolving 0.0088 parts by weight of (E) 1,2,4-triazole in 2.5 parts by weight of water; 7.6 parts by weight of hexamethyldisilazane as the surface treatment agent of the fumed silica; and 0.17 parts by weight of divinyltetramethyldisilazane, at room temperature for 1 hour. The resultant mixture was heated to 150° C. for 1 hour while mixing thereof. After that, the mixture was mixed in a dissolver under a heated and reduced pressure condition for 1.5 hour, followed by cooling thereof to room temperature, and a compound 2 was obtained.

To the compound 2 containing 100 parts by weight of component (A), there were added: 2.8 parts by weight of copolymer (component (A)) of dimethylsiloxane and methylvinylsiloxane, comprising 86.21% by-mole of (CH$_3$)$_2$SiO unit and 13.79% by mole of (CH$_3$)(CH$_2$=CH)SiO unit, being sequestered at both ends of the molecular chain thereof by a dimethylvinylsiloxy group; 4.2 parts by weight of copolymer (component (C)) of dimethylsiloxane and methylhydrogen siloxane being composed of 50% by mole of methylhydrogen siloxane unit <(CH$_3$)HSiO unit> and 50% by mole of dimethylsiloxane unit <(CH$_3$)$_2$SiO unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to mix them together.

The mixed composition was poured in a die having a thickness of 2 mm, the composition was press-cured at 170° C. for 10 minutes (primary vulcanization), and thus obtained a rubber sheet having a thickness of 2 mm. After that, secondary vulcanization was performed in an oven at 200° C. for 4 hours.

Comparative Example 2

An Example in which the Molar Ratio is Not Satisfied

To the compound 1 obtained by the same procedure as that in Example 1, containing 100 parts by weight of (A) dimethylpolysiloxane having a viscosity of 50,000 cSt, being sequestered at both ends of molecular chain thereof by a dimethylvinylsiloxy group, there were added: 1.3 parts by weight of copolymer (component (A)) of dimethylsiloxane and methylvinylsiloxane, containing 86.21% by mole of (CH$_3$)$_2$SiO unit and 13.79% by mole of (CH$_3$)(CH$_2$=CH)SiO unit, being sequestered at both ends of the molecular chain thereof by a dimethylvinylsiloxy group; 4.2 parts by weight of copolymer (component (C)) of dimethylsiloxane and methylhydrogen siloxane, being composed of 50% by mole of methylhydrogen siloxane unit <($CH_3$)HSiO unit> and 50% by mole of dimethylsiloxane unit <($CH_3$)$_2$SiO unit>, being sequestered at both ends of the molecular chain thereof by a trimethylsiloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Comparative Example 3

An Example in which Both the Amount of Vinyl Group Held by the Filler and the Molar Ratio are not Satisfied To the compound 2 obtained by the same procedure as that in Comparative Example 1, containing 100 parts by weight of (A) dimethylpolysiloxane having a viscosity of 50,000 cSt, being sequestered at both ends of the molecular chain thereof by a dimethylvinylsiloxy group, there were added: 2.8 parts by weight of copolymer (component (A)) of dimethylsiloxane and methylvinylsiloxane, being composed of 86.21% by mole of ($CH_3$)$_2$SiO unit and 13.79% by mole of ($CH_3$)($CH_2$=CH)SiO unit, being sequestered at both ends of the molecular chain thereof by a dimethylvinylsiloxy group; 8.5 parts by weight of copolymer (component (C)) of dimethylsiloxane and methylhydrogen siloxane, being composed of 50% by mole of methylhydrogen siloxane unit <($CH_3$)HSiO unit> and 50% by mole of dimethylsiloxane unit <($CH_3$)$_2$SiO unit, being sequestered at both ends of the molecular chain thereof by a trimethylsiloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Comparative Example 4

An Example in which the Filler does not Retain Vinyl Group

There were blended: 100 parts by weight of (A) dimethylpolysiloxane having a viscosity of 50,000 cSt, being sequestered at both ends of the molecular chain thereof by a dimethylvinylsiloxy group; 36 parts by weight of (B) fumed silica having a specific surface area of 300 m$^2$/g; an aqueous solution obtained by dissolving 0.0088 parts by weight of (E) 1,2,4-triazole in 2.5 parts by weight of water; and 7.6 parts by weight of hexamethyldisilazane as the surface treatment agent of the fumed silica, at room temperature for 1 hour while mixing thereof. The resulting mixture was heated to 150° C. for 1 hour. After that, the mixture was mixed in a dissolver under a heated and reduced pressure condition for 1.5 hour, followed by cooling thereof to room temperature, and a compound 3 was obtained.

To the compound 3 containing 100 parts by weight of (A) dimethylpolysiloxane having a viscosity of 50,000 cSt, being sequestered at both ends of the molecular chain thereof by a dimethylvinylsiloxy group, there were added: 5.6 parts by weight of copolymer (component (A)) of dimethylsiloxane and methylvinylsiloxane, being composed of 86.21% by mole of ($CH_3$)$_2$SiO unit and 13.79% by mole of ($CH_3$)($CH_2$=CH)SiO unit, being sequestered at both ends of the molecular chain thereof by a dimethylvinylsiloxy group; 8.5 parts by weight of copolymer (component (C)) of dimethylsiloxane and methylhydrogen siloxane being composed of 50% by mole of methylhydrogen siloxane unit <($CH_3$)HSiO unit> and 50% by mole of dimethylsiloxane unit <($CH_3$)$_2$SiO unit>, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes (primary vulcanization), and thus a rubber sheet having a thickness of 2 mm was obtained. After that, secondary vulcanization was performed in an oven at 200° C. for 4 hours.

Comparative Example 5

An Example in which a Large Amount of 1,2,4-triazole is Contained

There were mixed: 100 parts by weight of (A) dimethylpolysiloxane having a viscosity of 50,000 cSt, being sequestered at both ends of the molecular chain thereof by a dimethylvinylsiloxy group; 36 parts by weight of (B) fumed silica having a specific surface area of 300 m$^2$/g; an aqueous solution obtained by dissolving 2.24 parts by weight of (E) 1,2,4-triazole in 2.5 parts by weight of water; 7.6 parts by weight of hexamethyldisilazane and 0.44 parts by weight of divinyltetramethylsilazane as the surface treatment agents of the fumed silica, at room temperature for 1 hour. The mixture was heated to 150° C. for 1 hour while mixing thereof. After that, the mixture was mixed in a dissolver under heated and reduced pressure condition for 1.5 hour, followed by cooling thereof to room temperature, and a compound 4 was obtained.

To the compound 4 containing 100 parts by weight of (A) dimethylpolysiloxane having a viscosity of 50,000 cSt, being sequestered at both ends of the molecular chain by a dimethylvinylsiloxy group, there were added: 1.3 parts by weight of copolymer (component (A)) of dimethylsiloxane and methylvinylsiloxane, being composed of 86.21% by mole of ($CH_3$)$_2$SiO unit and 13.79% by mole of ($CH_3$)($CH_2$=CH) SiO unit, being sequestered at both ends of the molecular chain thereof by a dimethylvinylsiloxy group; 8.5 parts by weight of copolymer (component (C)) of dimethylsiloxane and methylhydrogen siloxane being composed of 50% by mole of methylhydrogen siloxane unit <($CH_3$)HSiO unit> and 50% by mole of dimethylsiloxane unit <($CH_3$)$_2$SiO unit, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to thereby mix them together.

The mixed composition was poured in a die having a thickness of 2 mm, the composition was press-cured at 170° C. for 10 minutes, (primary vulcanization), and thus a rubber sheet having a thickness of 2 mm was obtained. After that, secondary vulcanization was performed in an oven at 200° C. for 4 hours.

Comparative Example 6

An Example in Which no 1,2,4-triazole is Contained

There were blended: 100 parts by weight of (A) dimethylpolysiloxane having a viscosity of 50,000 cSt, being sequestered at both ends of the molecular chain thereof by a dimethylvinylsiloxy group; 36 parts by weight of (B) fumed silica having a specific surface area of 300 m²/g; 2.5 parts by weight of water; and 7.6 parts by weight of hexamethyldisilazane and 0.44 parts by weight of divinyltetramethyldisilazane as the surface treatment agents, at room temperature for 1 hour. The resulting mixture was heated to 150° C. for 1 hour while mixing thereof. After that, the mixture was mixed in a dissolver under a heated and reduced pressure condition for 1.5 hour, followed by the cooling thereof to room temperature, and a compound 5 was obtained.

To the compound 5 containing 100 parts by weight of (A) dimethylpolysiloxane having a viscosity of 50,000 cSt, being sequestered at both ends of the molecular chain thereof by a dimethylvinylsiloxy group, there were added: 1.3 parts by weight of copolymer (component (A)) of dimethylsiloxane and methylvinylsiloxane, being composed of 86.21% by mole of $(CH_3)_2SiO$ unit and 13.79% by mole of $(CH_3)$ $(CH_2=CH)SiO$ unit, being sequestered at both ends of the molecular chain thereof by a dimethlylvinylsiloxy group; 8.5 parts by weight of a copolymer (component (C)) of dimethylsiloxane and methylhydrogen siloxane being composed of 50% by mole of methylhydrogen siloxane unit <$(CH_3)HSiO$ unit> and 50% by mole of dimethylsiloxane unit <$(CH_3)_2SiO$ unit, being sequestered at both ends of the molecular chain thereof by a trimethyl siloxy group; platinum-octanol complex solution (component (D)) (platinum content of 4.0%) in an amount of 20 ppm as platinum atom, as the platinum catalyst; and 0.01 parts by weight of 1-ethynyl-1-cyclohexanol as the suppressor of curing, to mix them together.

The mixed composition was poured in a die having a thickness of 2 mm, the composition was press-cured at 170° C. for 10 minutes, (primary vulcanization), and thus a rubber sheet having a thickness of 2 mm was obtained. After that, secondary vulcanization was performed in an oven at 200° C. for 4 hours.

These rubber sheets obtained were evaluated as follows. The results are given in Table 1.

Mechanical Properties

The evaluation of mechanical properties was in accordance with JIS K6249.

Tracking Test

Determination whether the test results were acceptable or unacceptable was in accordance with the "Test method for evaluating resistance to tracking using the inclined-plane method, (Method 1)" specified in IEC Publ. 587 (1984).

That is, through the use of a silicone rubber sheet having a thickness of 6 mm and under the condition of an applied voltage of 4.5 kV, testing time of 6 hours and flow rate of the test liquid of 0.6 ml/min, tracking was generated in the specimen, and the specimen which was in conduction or which was penetrated (fractured) was determined to be unacceptable, and the specimen in which there is no tracking generated was determined to be acceptable.

Tension Set Test

As to a specimen having a thickness of 2 mm, a width of 10 mm, and a length of 90 mm, there was given 20 μm of space at both ends thereof, while being given 50 mm of distance between marked lines at center thereof. A strain applied to the specimen was set to 200%. The specimen was fixed by a jig and the respective specimens were subjected to heating in an oven at the condition of 50° C. for 48 hours and 90° C. for 24 hours.

After the heat treatment, the respective specimens were allowed to stand in an elongated state at 25° C. for 30 minutes. Then, a specimen was released from the jig and allowed to stand for 30 minutes. After that, the distance between the marked lines was measured. The calculation of the tension set (%) was given by [(Distance between the marked lines after applying tension)−(Distance between the marked lines before applying tension)]/[(Elongated distance)−(Distance between the marked lines after applying tension)].

TABLE 1

|  | Example 1 | Example 2 | Example 3 | Example 4 |
|---|---|---|---|---|
| Types of Compounds | Compound 1 | Compound 1 | Compound 1 | Compound 1 |
| (A) Copolymer of dimethylsiloxane and methylvinylsiloxane (parts)*1 | 1.3 | 0 | 1.3 | 0 |
| (C) Copolymer of dimethylsiloxane and methylhydrogen siloxane (parts) | 8.5 | 10.2 | 10.2 | 8.5 |
| Contained amount of 1,2,4-triazole relative to the total amount of component (A) and component (C) (ppm)*1 | 80 | 80 | 79 | 81 |
| [Contained amount of vinyl groups carried by the filler (mol/g)]/[Contained amount of vinyl groups carried by the composition (mol/g)] (%) | 44 | 59 | 44 | 59 |
| (Molar number of hydrogen atoms binding to the silicone atoms in the composition)/(Molar number of alkenyl group binding to the silicon atoms in the composition) | 3.4 | 5.4 | 4.1 | 4.5 |
| Hardness (Durometer A) | 43 | 41 | 38 | 40 |
| Tensile strength (MPa) | 10.4 | 10.3 | 10.2 | 10.2 |
| Elongation (%) | 820 | 850 | 750 | 750 |
| Tension set: Elongation rate 200%, 50° C., 2 day (%) | 1.2 | 0.9 | 1.2 | 1.1 |
| Tension set: Elongation rate 200%, 90° C., 1 day (%) | 1.4 | 1.3 | 1.5 | 1.3 |
| Test of tracking resistance: test voltage 4.5 kV | Acceptable | Acceptable | Acceptable | Acceptable |

|  | Comparative Example 1 | Comparative Example 2 | Comparative Example 3 | Comparative Example 4 | Comparative Example 5 | Comparative Example 6 |
|---|---|---|---|---|---|---|
| Types of Compounds | Compound 2 | Compound 1 | Compound 2 | Compound 3 | Compound 4 | Compound 5 |
| (A) Copolymer of dimethylsiloxane and methylvinylsiloxane (parts)*1 | 2.8 | 1.3 | 2.8 | 5.6 | 1.3 | 1.3 |
| (C) Copolymer of dimethylsiloxane and methylhydrogen siloxane (parts) | 4.2 | 4.2 | 8.5 | 8.5 | 8.5 | 8.5 |

TABLE 1-continued

| | | | | | | |
|---|---|---|---|---|---|---|
| Contained amount of 1,2,4-triazole relative to the total amount of component (A) and component (C) (ppm)*1 | 82 | 83 | 79 | 77 | 20000 | 0 |
| [Contained amount of vinyl groups carried by the filler (mol/g)]/[Contained amount of vinyl groups carried by the composition (mol/g)] (%) | 17 | 44 | 34 | 0 | 44 | 44 |
| (Molar number of hydrogen atoms binding to the silicone atoms in the composition)/(Molar number of alkenyl group binding to the silicon atoms in the composition) | 1.6 | 1.7 | 2.6 | 2.4 | 3.5 | 3.5 |
| Hardness (Durometer A) | 36 | 39 | 38 | 36 | 35 | 53 |
| Tensile strength (MPa) | 9.5 | 10.1 | 7.7 | 7.3 | 7.3 | 10.3 |
| Elongation (%) | 800 | 700 | 780 | 750 | 750 | 610 |
| Tension set: Elongation rate 200%, 50° C., 2 day (%) | 2.0 | 1.4 | 1.8 | 2.8 | 2.2 | 1.1 |
| Tension set: Elongation rate 200%, 90° C., 1 day (%) | 2.6 | 1.5 | 2.2 | 3.0 | 2.8 | 1.3 |
| Test of tracking resistance: test voltage 4.5 kV | Unacceptable | Unacceptable | Unacceptable | Unacceptable | Acceptable | Unacceptable |

*1 The addition amount of (A) component (copolymer of Copolymer of dimethylsiloxane and methylvinylsiloxane) and (C) component (copolymer of dimethylsiloxane and methylhydrogensiloxane) corresponds to 100 parts by weight of (A) dimethylpolysiloxane being sequestered at both ends of molecular chain thereof by dimethylvinylsiloxy group, in the compounds 1 to 5 produced in Examples 1 to 4 and Comparative Examples 1 to 6.

The invention claimed is:

1. A silicone rubber composition comprising:
   (A) 100 parts by weight of a dimethylpolysiloxane being sequestered at both ends of the molecular chain thereof by a dimethylvinylsiloxy group;
   (B) 5 to 100 parts by weight of a dry silica, being treated by a vinyl group-containing organosilicon compound and having a specific surface area of 50 m²/g or more;
   (C) 5 to 100 parts by weight of a copolymer of dimethylsiloxane and methylhydrogen siloxane;
   (D) platinum or a platinum compound as a curing agent in an amount of 1 to 1,000 ppm as platinum atom relative to the total amount of component (A) and component (C); and
   (E) a triazole or a derivative of a triazole in an amount of 1 to 10,000 ppm relative to the total amount of component (A) and component (C),
   wherein the amount of vinyl group derived from the component (B) is 40% by mole or more to the total amount of vinyl group in the composition, and the ratio of the molar number of hydrogen atoms binding to the silicon atoms in the composition relative to the molar number of alkenyl group binding to the silicon atoms is in a range of 3.0 to 10.0.

2. The silicone rubber composition according to claim 1 being in a liquid form.

3. The liquid silicone rubber composition according to claim 2, being high voltage insulation parts.

4. A high voltage insulation part, comprising a cured material of the liquid silicone rubber composition according to claim 2.

* * * * *